United States Patent [19]

Hinden

[11] Patent Number: 4,820,569
[45] Date of Patent: Apr. 11, 1989

[54] LOW LOSS FLEXIBLE CONNECTOR FOR AIR DUCTS

[76] Inventor: Milton Hinden, Rt. #110, Farmingdale, N.Y. 11735

[21] Appl. No.: 46,681

[22] Filed: May 7, 1987

[51] Int. Cl.⁴ .............................................. F16L 59/14
[52] U.S. Cl. .................... 428/124; 285/424; 428/126; 428/906
[58] Field of Search ............ 29/509; 285/424; 428/124, 126, 906

[56] References Cited

U.S. PATENT DOCUMENTS

| | | | |
|---|---|---|---|
| 2,739,093 | 3/1956 | Bull | 428/316.6 X |
| 2,777,573 | 1/1957 | Goldsmith | 285/424 X |
| 2,825,384 | 3/1958 | Goldsmith | 285/424 X |
| 3,128,220 | 4/1964 | Gracer | 29/509 |
| 3,197,860 | 8/1965 | Gracer | 29/509 |
| 3,214,807 | 11/1965 | Hinden | 285/424 X |
| 3,251,382 | 5/1966 | Tatsch | 428/36 X |
| 3,283,888 | 11/1966 | Scott | 428/64 X |
| 3,352,566 | 11/1967 | Kennedy | 428/116 X |
| 3,400,040 | 9/1968 | Osgood | 428/126 |
| 3,949,137 | 4/1976 | Akrongold et al. | 428/15 X |
| 3,954,537 | 5/1976 | Alfter et al. | 428/482 X |
| 4,183,557 | 1/1980 | Hinden | 285/424 X |
| 4,233,350 | 11/1980 | Shiflet | 428/138 X |

FOREIGN PATENT DOCUMENTS 728617  2/1966  Canada ............................ 428/124

OTHER PUBLICATIONS

Page from Duro Dyne Corp. Brochure Duro Dyne National Corp., Route 110, Farmingdale, N.Y. 11735.
Duro Dyne Brochure; entitled "Insulfab" pp. 1 & 2 of 6/86.

*Primary Examiner*—Henry F. Epstein
*Attorney, Agent, or Firm*—Mark T. Basseches; Paula T. Basseches

[57] ABSTRACT

A low thermal loss flexible connector stock material comprises a pair of metal strips, one edge of each of said strips being formed into clamping relation of margins of a pair of foam webs. When the strips are in overlapping relation the webs lie in face-to-face contact, the outermost web being deflected into spaced relation from the innermost web when the strips are folded into co-planar alignment, thereby defining a space between the webs.

3 Claims, 1 Drawing Sheet

U.S. Patent
Apr. 11, 1989
4,820,569
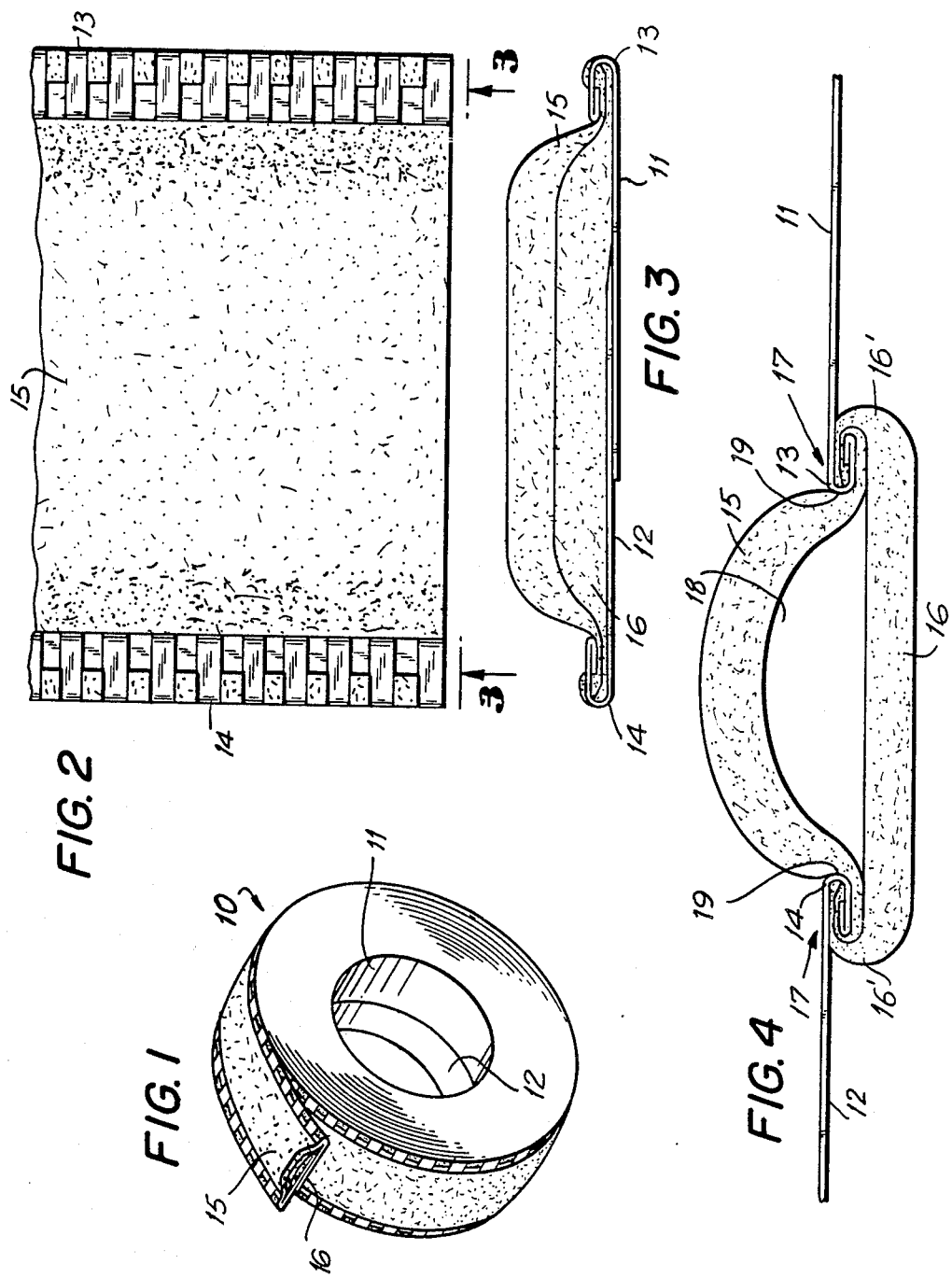

LOW LOSS FLEXIBLE CONNECTOR FOR AIR DUCTS

BACKGROUND OF THE INVENTION

1. Field of the Invention

The present invention is in the field of air conduits and relates more particularly to an improved flexible connector assembly which evinces low heat loss.

2. The Prior Art

In air conduit systems such as air cooling and heating systems it is conventional to provide a flexible connector material which bridges the gap betseen adjacent duct ends. For instance, it is conventional to employ such flexible connector material to bridge the gap between the plenum of a heater and the ducting leading from the heater to the various registers within a dwelling.

The function of such connector material is twofold, namely, as a means of effecting a seal between two duct components which may not be disposed in perfect mating alignment, and as a means for dampening mechanical vibrations generated by the blower. The dampening or vibration attenuating effect is achieved since the flexible connector material is comprised of vibration dampening material, such as canvas, rubberized cloth or the like.

In conventional flexible connectors the canvas or like material is clamped at its side edges to a pair of metal strips.

In use, an elongated length of such material is cut from a roll and bent to the configuration of the adjacent duct ends, each of the metal strips being fastened to an end of the adjacent ducts. In this manner the pliable canvas acts to attenuate vibrations present in one duct and reduce the amount of vibration transmitted to the other duct.

A representative example of an improved type of flexible connector material may be found in U.S. Pat. No. 3,214,807 of Nov. 2, 1965, issued to the inventor hereof. An insulating flexible connector structure is shown in U.S. Pat. No. 4,183,557 of Jan. 15, 1980.

In order to minimize heat loss it is conventional practice to line the interiors of the air ducts or conduits with fibrous batts of insulating material. While such ducts are efficient to minimize heat loss, substantial heat loss has been found to occur through the joint provided by the flexible connector. The heat loss is occasioned primarily by the fact that the fabric material spanning the junction between ends is relatively inefficient as an insulating material.

SUMMARY OF THE INVENTION

The present invention may be summarized as directed to an improved flexible connector material, and more particularly to a flexible connector material which is highly efficient in preventing heat loss at the interface between ducts connected by the material.

Still more particularly, the invention is directed to a flexible connector material which is comprised of a pair of metal strips, known per se, a side margin of each said strip being clampingly connected to a pair of superposed webs of foraminous polymeric material.

In its unstressed condition the foraminous material is of substantial thickness, i.e. a quarter of an inch, thus being greater thnn the thickness of the strips. When the two metal strips are disposed in partial overlapping condition, with the clamped edges outermost, the foraminous strips lie in face-to-face abutting relation. When the strips are outwardly folded, the upper of the two foraminous webs (the web spaced furthermost from the strips when the latter are superposed) will buckle outwardly from the lower strip, with the result that a closed cell or chamber is defined between the webs.

Thus, when the strips are applied to adjacent duct ends, a closed tubular surrounding cell or chamber is defined, providing a highly efficient insulating area between duct ends, augmenting the inherently effective properties of the foam material.

It is accordingly an object of the inventon to provide an improved flexible connector material.

A further object of the invention is the provision of a flexible connector material which minimizes heat loss at the interface between ducts connected by the material.

Still a further object of the invention is the provision of flexible connector material of the type described which may be formed into a compact roll for shipping when the metal strips are in their overlapping condition but which assumes a three dimensional tubular conformation when the metal straps are unfolded from a bulk roll and positioned for application to duct ends.

BRIEF DESCRIPTION OF THE DRAWINGS

To attain these objects and such further objects as may appear herein or hereinafter be pointed out, reference is made to the accompanying drawings, forming a part hereof, in which:

FIG. 1 is a perspective view of a roll of flexible connector material in accordance with the invention;

FIG. 2 is a top plan view on enlarged scale of a segment of the material;

FIG. 3 is an end elevational view of the material of FIG. 2 taken in the direction of the arrows 3—3;

FIG. 4 is a view similar to FIG. 3 showing the position of the parts when the components of the connector are unfolded.

DETAILED DESCRIPTION OF THE DRAWINGS

Referring now to the drawings, there is shown in FIG. 1 a roll 10 of flexible connector material in the as-shipped condition.

As more particularly shown in FIGS. 2 and 3, the material is comprised of first and second metallic strips 11, 12, the marginal edges 13, 14 of which have been roll formed clampingly to encompass the marginal edges of superposed upper and lower foraminous webs 15, 16.

The manner of forming the metal strips about the foraminous webs is more particularly set forth in the above referenced U.S. Pat. No. 3,214,807 as well as in U.S. Pat. No. 2,825,384 of March, 1958, U.S. Pat. No. 2,777,573 of Jan. 1957 and others. Accordingly a detailed description of such method need not here be undertaken.

Briefly stated, the method involves simultaneously feeding a pair of metal strips 11, 12 in overlapping relation, as shown in FIG. 3, into a roll forming machine, together with the foraminous webs 15, 16 in such manner that the edges of the metal strips are progressively rolled inwardly into clamping engagement of the edges of the foraminous strips while simultaneously coiling the roll formed composite into a coil, such as shown at 10. The rolling process may be repeated so as to provide a double thickness of the metal strips at the edges.

In order to assure secure bonding of the metal to the foraminous material the edge portions of the metal strips may be punched out, as shown in U.S. Pat. No. 3,197,860 of Aug. 3, 1965.

In use, a length of coiled stock material is unrolled from the coil 10 and bent in a metal bending brake to the configuration of the duct. Alternatively where a round duct pair are to be linked, the material is formed about a mandrel to a circular configuration As will be apparent from a comparison of FIGS. 3 and 4, when the metal strips 11, 12 are unfolded from the position of FIG. 3 to that of FIG. 4 edge portions 16' are wrapped or rolled about the clamping area 17, with the result that the lower foraminous web 16 is foreshortened in a widthwise direction to a greater extent than the upper web 15. As a result of such foreshortening movement and as a further result of the inherent shape retaining nature of the foraminous material, the upper web 15 is bowed and caused to be deflected upwardly, defining an interior cavity 18 between the webs 15 and 16. This cavity or chamber 18 defines a dead air space between the webs, providing a high degree of thermal insulation, thus minimizing heat loss through the space between ducts which is spanned by the flexible connector material.

As noted previously, the foraminous material may be comprised of a closed cell polymeric material, such as polyurethane, or may be comprised of an open celled material, one or both surfaces of which have been treated to make the same impervious to air.

As an illustrative example, a polyurethane foam of approximately ¼" thickness has been successfully employed. Desirably, the selected foam should be resilient and self-supporting so that when the assembly is folded from the condition of FIG. 3 to that of FIG. 4, the upper web 15 will be self-sustaining. If, for instance, two layers of a material such as canvas were employed, the desired spacing would not occur, the failure to achieve the spacing in such instance being due to the inherent flaccid nature of canvas plus the fact that the opening of the material from the condition of FIG. 3 to that of FIG. 4 would not involve a significantly greater foreshortening of the web 16 as compared with the lower web 15.

A further factor tending to bow the upper web 15 resides in the edge portions 19 of the clamping portions of the metal strips pressing into the upper web 15 when the strips 11, 12 are shifted to the position of FIG. 4.

In some instances it may be preferable to clamp the foraminous material between the strips 11 12 in the manner shown and described in my above mentioned U.S. Pat. No. 3,214,807 since such clamped configuration would minimize damage to the web 16 when the connector material is bent in a bending brake. However, it should be noted that even if some localized damage to the web 16 is inadvertently encountered during bending, the junction between adjacent ducts will still remain sealed despite small compromise of the integrity of the chamber 18.

As will be apparent to a skilled worker in the art familiarized with the instant disclosure, numerous variations in details of construction may be made in the embodiment specifically illustrated. Accordingly, the invention is to be broadly construed within the scope of the appended claims.

Having thus described the invention and illustrated its use, what is claimed as new and is desired to be secured by Letters Patent is:

1. A low thermal loss flexible connector stock material comprising a coil comprised of two elongate metal strips substantially flat in transverse section, upper and lower superposed resilient compressible foraminous polymeric webs of thickness, in the unstressed condition, greater than the thickness of said strips, mounted between said strips, a side margin of each said strip being bent into overlapping clamping connection with a different one of the margins of said webs, said webs being disposed in face-to-face engagement when said strips are in overlapping relation, said upper web being deflected into spaced relation from said lower web when said strips are folded outwardly into co-planar alignment.

2. Flexible connector stock material in accordance with claim 1 wherein said foraminous polymeric material comprises a closed cell structure.

3. Flexible connector stock material in accordance with claim 1 wherein said foraminous polymeric material comprises an open cell structure, said material including an air seal coating on at least one surface thereof.

* * * * *